United States Patent
Nakamura

(10) Patent No.: US 6,433,457 B1
(45) Date of Patent: Aug. 13, 2002

(54) BRUSHLESS AC GENERATOR

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/873,410

(22) Filed: Jun. 5, 2001

(51) Int. Cl.[7] .............................................. H02K 1/22
(52) U.S. Cl. ........................................ 310/263; 310/90
(58) Field of Search ........................ 310/90, 90.5, 263, 310/254, 257, 44; 384/492, 625

(56) References Cited

U.S. PATENT DOCUMENTS

| | | | | |
|---|---|---|---|---|
| 5,160,864 A | * | 11/1992 | Saito ............................. | 310/54 |
| 5,501,747 A | * | 3/1996 | Masterller et al. ........... | 148/311 |
| 5,785,433 A | * | 7/1998 | Takahashi et al. ........... | 384/539 |
| 5,836,270 A | * | 11/1998 | Aoki et al. ................ | 123/41.31 |
| 6,267,511 B1 | * | 7/2001 | Takemura et al. ........... | 384/492 |

FOREIGN PATENT DOCUMENTS

EP    0 734 607    10/1996

* cited by examiner

Primary Examiner—Nestor Ramirez
Assistant Examiner—Thanh Lam
(74) Attorney, Agent, or Firm—Oliff & Berridge, PLC

(57) ABSTRACT

A brushless AC generator includes a stator having a an armature coil, a rotor, a frame for supporting the stator and the rotor, a pulley driven by a belt, a pulley-side bearing and anti-pulley-side bearing. The rotor is comprised of a magnetic pole core having a plurality of alternately polarized magnetic pole pieces, a rotary yoke integrated with a group of the magnetic pole pieces polarized in one polarity and fixed to the rotary shaft. The stator is comprised of a stationary yoke interposed between the other group of the pole pieces polarized in the other polarity and the rotary yoke and a field coil. The anti-pulley-side bearing has a higher magnetic permeability than the pulley-side bearing. The above feature can reduce magnetic reluctance of the AC generator without lowering the reliability of the AC generator.

7 Claims, 5 Drawing Sheets

BRUSHLESS AC GENERATOR

BACKGROUND OF THE INVENTION

1. Field of the Invention

The present invention relates to a brushless AC generator to be mounted in an agricultural or a construction vehicle or the like.

2. Description of the Related Art

A brushless type AC generator that has no brushes is often mounted in an agricultural or a construction vehicle such as a combine harvester or a bulldozer, because such an AC generator is used in a severely dusty environment and required to be maintenance free. This brushless AC generator is so cold a rotary-magnetic-field-type generator, an example of which is disclosed in EP0734607B1. In such an example, a rotor has a plurality of magnetic poles pieces of that is disposed to rotate inside a stator, and a field coil that is surrounded by the pole pieces and fixed to a frame.

The plurality of the pole pieces is polarized alternately and disposed in a circumference at equal intervals and is fixed to each other by a nonmagnetic ring, such as a stainless ring, to rotate together.

This brushless AC generator has the following drawbacks. That is, the output power per size thereof is smaller than the output power per size of an AC generator that has brushes. This is because the magnetic circuit of the brushless generator has series air gaps, which increase magnetic reluctance and decrease the magnetic flux.

SUMMARY OF THE INVENTION

The present invention has been made in view of the above problem of the conventional art and has an object of providing an improved brushless AC generator that can generate an increased output power per size without lowering the reliability thereof.

According to a main feature of the present invention, a brushless AC generator includes a stator having an armature coil, a rotor having a shaft, a frame, a pulley to be driven by a belt, a pulley-side bearing supported by the frame at a portion near the pulley and anti-pulley-side bearing supported by the frame at a portion remote from the pulley. The rotor is comprised of a magnetic pole core having a plurality of alternately polarized magnetic pole pieces, a rotary yoke integrated with a group of the magnetic pole pieces that are polarized in one polarity and fixed to the rotary shaft. A stationary yoke is interposed between the other group of the pole pieces that are polarized in the other polarity and the rotary yoke, and a field coil is fixedly surrounded by the magnetic pole core. The anti-pulley-side bearing has a higher magnetic permeability than the pulley-side bearing. Further, the anti-pulley bearing includes higher silicon content than the pulley-side bearing, and the end surface of the anti-pulley-side bearing faces an axial end of the rotary yoke. Therefore, the magnetic reluctance of the magnetic path between the rotary yoke and the stationary yoke can be reduced by the bearing that has an increased magnetic permeability, so that magnetic flux, which is inversely proportional to the magnetic reluctance of all the magnetic paths, can be increased, thereby, to increase the generator output power.

According to another feature of the invention, the outer ring of the anti-pulley-side bearing includes higher silicon content than the outer ring of the pulley-side-bearing, and the end surface of the anti-pulley-side bearing faces an end surface of the rotary yoke.

Because the pulley-side-bearing bears more weight of the pulley that is driven by a belt, the outer ring of the bearing has to be tightly supported by the frame by means of a spacer member such as a retainer plate. Therefore, the pulley-side-bearing is disposed remote from the rotary yoke or the magnetic path of the rotor. On the other hand, the anti-pulley-side bearing bears less pulley load and need not any spacer member. Therefore, it can be disposed near the rotary yoke so that the magnetic reluctance thereof can be reduced and the output power can be increased if it is used as a portion of a magnetic path. Moreover, a standard type or mass-produced bearing can be used for the pulley-side-bearing that bears heavy weight of the pulley, so that manufacturing cost can be prevented from rising.

According to another feature of the invention, the outer ring of the anti-pulley-side bearing includes 0.9–1.1 weight % silicon. In other words, the inner and outer rings of the anti-pulley-side bearing function as a magnetic path between the rotary yoke and the stationary yoke and rotatably supports the rotary shaft, includes 0.9–1.1 weight % silicon while a standard type carbon chrome steel bearing includes 0.2–0.35 weight %.

If the silicon content decreases from the above range, the magnetic permeability lowers. On the other hand, the machinability lowers and the rate of thermal expansion lowers if the silicon content increases. If the thermal expansion of the shaft lowers during high temperature operation, the fit between the bearing box of the frame, which usually supports the shaft made of a low-priced carbon steel, and the outer ring of the bearing on the side opposite the pulley may loosen and cause wear around the fit. This problem can be solved by a simple way of changing silicon content according to the invention.

According to another feature of the invention, a resinous cylindrical member is disposed between the outer ring of the anti-pulley-side bearing and a bearing box for supporting the outer ring.

Therefore, loosening of the fit between the bearing box of the rear frame and the anti-pulley-side bearing during high temperature operation can be prevented, so that the wear can be prevented and the reliability and durability thereof can be improved.

According to another feature of the invention, the bearing box that supports the outer ring of the pulley-side bearing is comprised of an approximately cylindrical member that includes 0.9–1 weight %, and is integrated with the frame.

Therefore, loosening of the fit between the bearing box of the rear frame and the outer ring of the anti-pulley-side bearing can be restrained during high temperature operation, so that the wear can be reduced and the reliability and durability thereof can be improved.

A cooling passage may be disposed near the outside surface of the bearing box that supports the outer ring of the anti-pulley-side bearing, so that loosening of the fit between the rear frame and the anti-pulley-side bearing during high temperature operation can be restricted. This can reduce the wear and increase the reliability and durability thereof.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

PREFERRED EMBODIMENTS OF THE INVENTION

Figure 1:
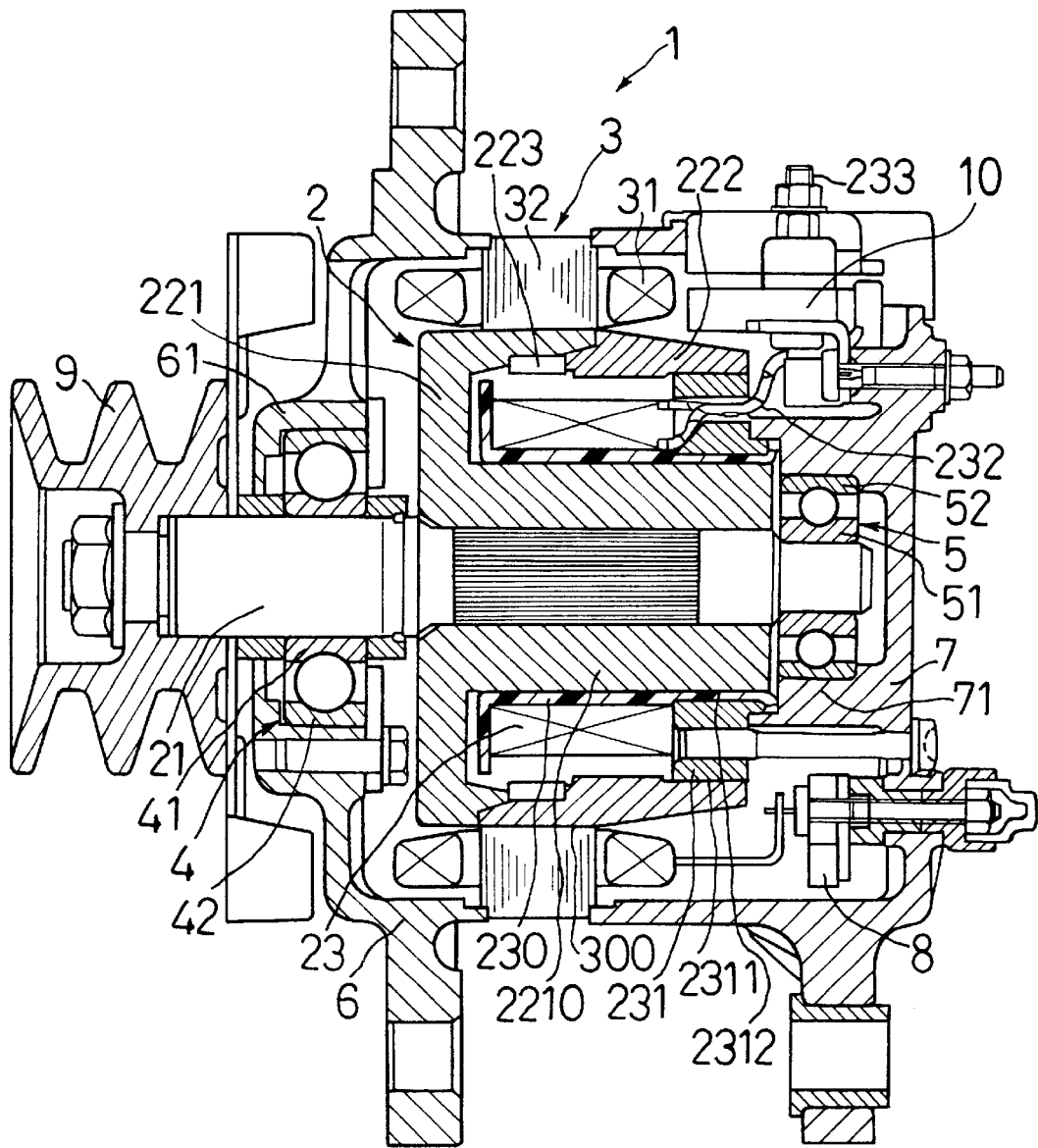
FIG. 1 is an axial cross-sectional view of a vehicle brushless AC generator according to a first embodiment of the invention.

A vehicle brushless AC generator according to a first embodiment of the invention is shown in FIG. 1. The brushless generator 1 is comprised of a rotor 2 having a shaft 21, a stator 3 that functions as an armature, a pair of ball bearings 4 and 5 that rotatably supports the shaft 21 and the rotor 2, a pair of frames 6 and 7, a rectifier unit 8 that is electrically connected to the stator 3 to convert AC power to DC power, and etc. The rotor 2 includes a pair of magnetic pole cores 221 and 222 for providing magnetic field and a field coil 23 fixed to a portion surrounded by the pole pieces. The rear frame 7 is made of magnetically permeable soft iron.

The pole core 221 has a boss portion or a rotary yoke 2210 and claw-shaped pole pieces 222. The rotary yoke 2210 is fitted to the shaft 21 and the claw-shaped pole pieces 222 are formed at an end of the pole core 221. The claw-shaped pole pieces 222 are fixed together by a nonmagnetic ring 223 by welding or soldering.

A ring-shaped ground plate 231, which is a portion of the stationary yoke, is fitted and fixed to the inner periphery of the rear frame 7, which is also a portion of the stationary yoke. The inner peripheral surface of the ground plate 231 faces the outer peripheral surface of the rotary yoke 2210 of the pole core 221 through a small gap 2312, and the outer peripheral surface of the ground plate 231 faces the inner peripheral surface of the claw-shaped pole pieces of the pole core 222 through a small gap 2311. Accordingly, the ground plate 231 forms a portion of a magnetic circuit or a magnetic path of magnetic flux.

The field coil 23 is wound around a resinous bobbin 230, which is fitted into the inner periphery of the ground plate 231. Accordingly, the field coil 23 is fixed to the rear frame 7 via the ground plate 231.

Reference numeral 10 is a regulator for controlling output power by controlling current supplied to the field coil 23. The regulator 10 is connected to a terminal 233 via a field coil lead wire 232.

The stator 3 has a stator core 32 that is wound by an armature winding 31. The inner peripheral surface of the stator core 32 faces the outer peripheral surface of the rotor 2 through a gap 300.

The pair of a front frame 6 and a rear frame 7 is fastened, via the stator core 3, to each other by through bolts (not shown). The front frame 6 and the rear frame 7 rotatably support the shaft 21 respectively via the bearing 4 and the bearing 5.

An outer ring 42 of the bearing 4 is supported by a bearing box 61 of the front frame 6, which is disposed near a pulley 9, and an inner ring of the bearing 4 rotatably supports the shaft 21. The inner ring 51 of the bearing 5 is fitted to the shaft 21, and the outer ring 52 of the bearing 5 is supported by a bearing box 71 of the rear frame 7, which is disposed remote from the pulley 9. The pulley 9 is fixed to an outwardly extending front end of the shaft 21. The pulley 9 is driven by an engine (not shown).

The inner ring 41 and the outer ring 42 of the pulley-side bearing 4 are made of high carbon chrome steel SAE52100 that includes 0.25 weight % silicon, which is one of standard type bearings. On the other hand, the inner and outer rings 51 and 52 of the other bearing 5 includes 1 weight % silicon, which is four times as much as the silicon content of the high carbon chrome steel SAE52100.

The magnetic circuit is described below.

Effective magnetic flux $\Phi$ that is related to the output power of the generator is expressed as follows: $\Phi=AT/Rm$, where the magneto-motive force that is the product of the field current and the number of turns of the field coil is AT, and the magnetic reluctance of the whole magnetic circuit is Rm. Therefore, if the magnetic reluctance is reduced, the magnetic flux $\Phi$ is increased.

In this magnetic circuit, most of the magnetic flux flowing through the rotary yoke 2210 of the magnetic pole core 221 flows from the outer periphery of the pole core 221, through the gap 2312, ground plate 231 and gap 2311, to the pole core 222.

A portion of the magnetic flux $\Phi$ flowing through the shaft 21 and the rotary yoke 2210 of the pole core 221 flows through the bearing 5, the rear frame 7 to the ground plate 231, and from the ground plate 231 to the pole core 222 through the gap 2311. A portion of the flux flowing into the rear frame 7 from the shaft 21 and the rotary yoke 2210 of the pole core 221 through the bearing 5 flows from the shaft 21 through the inner ring 51 of the bearing 5, balls of the anti-pulley-side bearing 5, the outer ring 52 to the rear frame 7, and the rest flows from the rotary yoke 2210 through the gap and the outer ring 52 of the bearing 5, to the rear frame 7.

The inner ring 51 and the outer ring 52 of the anti-pulley-side bearing 5 are made of material that includes more silicon than the conventional material, such as material SAE52100. For example, the material includes 0.9–1.1 weight % or, more preferably, 0.95–1.05 weight % silicon.

Accordingly, the bearing 5 provides better magnetic permeability than conventional bearings so that the generator can generate more output power. As a result, thermal expansion of the outer ring 52 is lowered so that the outer ring 52 can be prevented from rotating.

Figure 2:
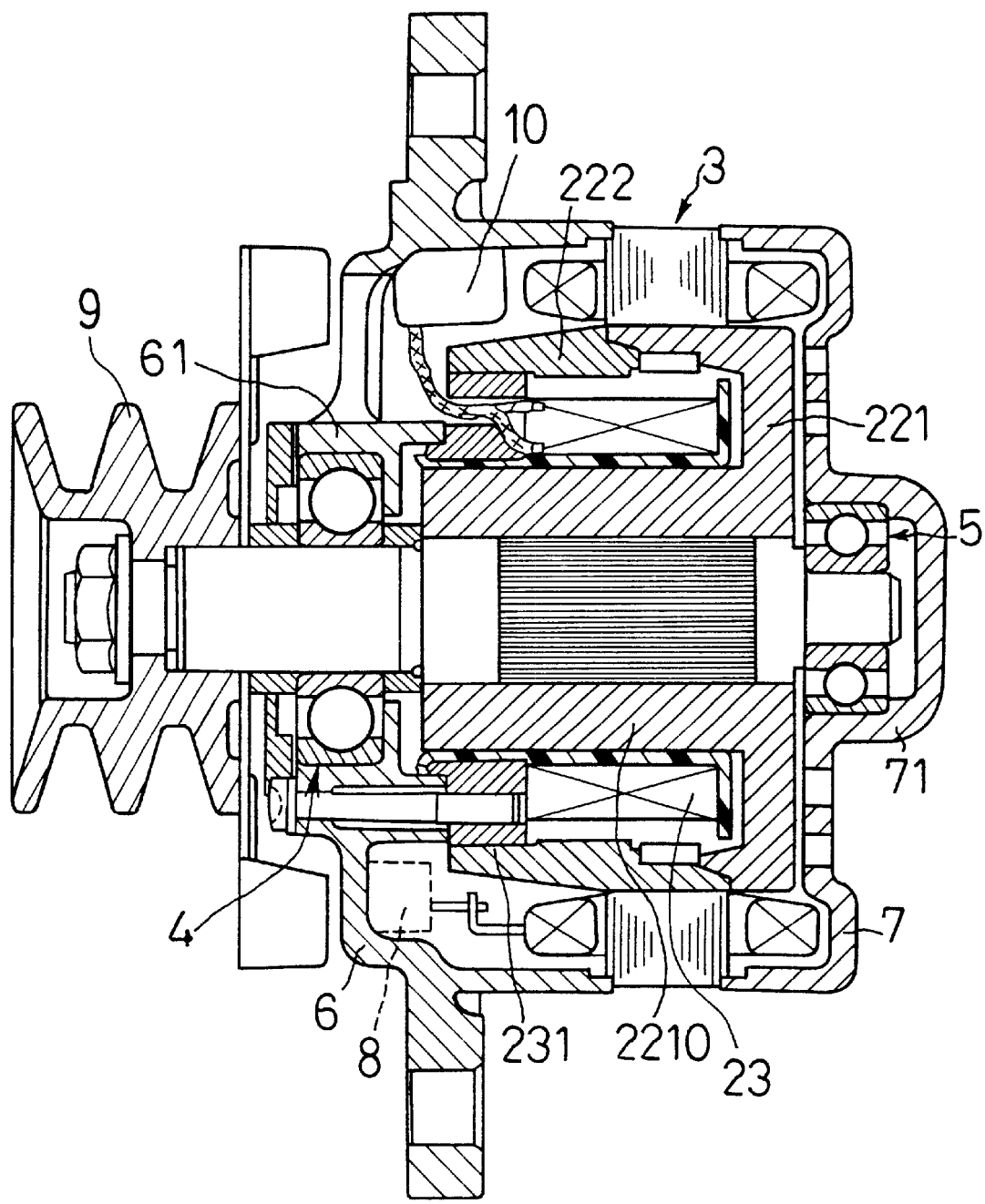
FIG. 2 is an axial cross-sectional view of a variation 1 of the generator shown in FIG. 1.

In the above first embodiment, the field coil 23 is fixed to the rear frame 7 on the side of the frame remote from the pulley, as shown in FIG. 2. However, the field coil 23 can be fixed to the front frame 6 near the pulley 9. The gap between the ground plate 231 and the pole core 222 is positioned near the bearing 4 near the pulley 9, and the bearing 5 on the side of the frame remote from the pulley is positioned to face the axial end-surface of the pole core 221. Therefore, there is little turbulence in the magnetic flux so that stable parallel magnetic circuit can be formed, resulting in decrease of the magnetic reluctance.

Figure 4:
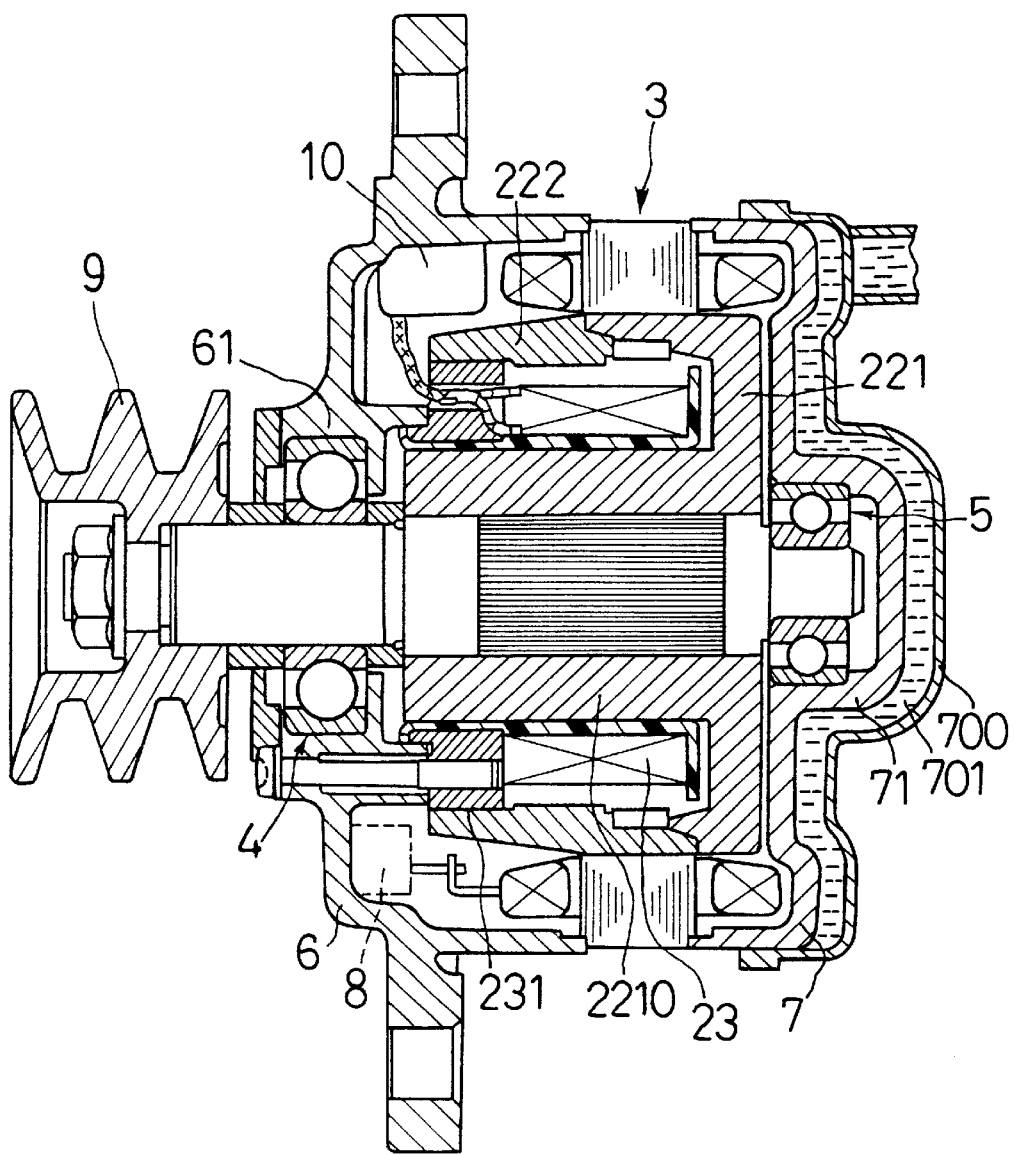
FIG. 4 is an axial cross-sectional view of a variation 2 of the generator shown in FIG. 1.

As shown in FIG. 4, a cover 700 is added to the rear frame 7. The cover 700 faces the rear side surface of the rear frame 7 at a certain gap and envelops the same. The gap forms a water tank 701, from which water is circulated by an outside pump.

Therefore, the temperature rise of the bearing box 71 and the outer ring 52 is suppressed so that the undesired rotation of the outer ring 52 relative to the bearing box 71 can be prevented even if the thermal expansion of the outer ring 52 lowers due to increase in silicon content.

Figure 5:
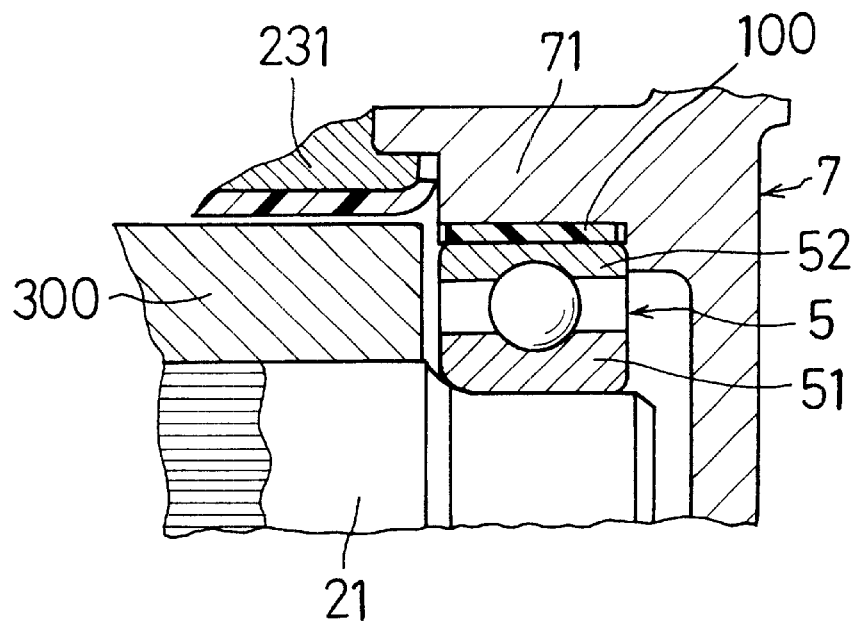
FIG. 5 is a fragmentary axial cross-sectional view of a variation 3 of the generator shown in FIG. 1.

As shown in FIG. 5, a resinous (e.g. polyamide) sleeve 100, in addition to the first embodiment shown in FIG. 1, is inserted between the outer ring 52 of the bearing 5 and the bearing box 71 that is integrated with the rear frame 7 and protrudes from the rear frame 7 in the axial direction.

Therefore, the undesired rotation of the outer ring 52 relative to the bearing box 71, which may be otherwise caused due to decrease in the thermal expansion by increase in the silicon content, can be suppressed. It is also possible to add magnetic powder to the sleeve 100 to reduce the magnetic reluctance thereof.

Figure 6:
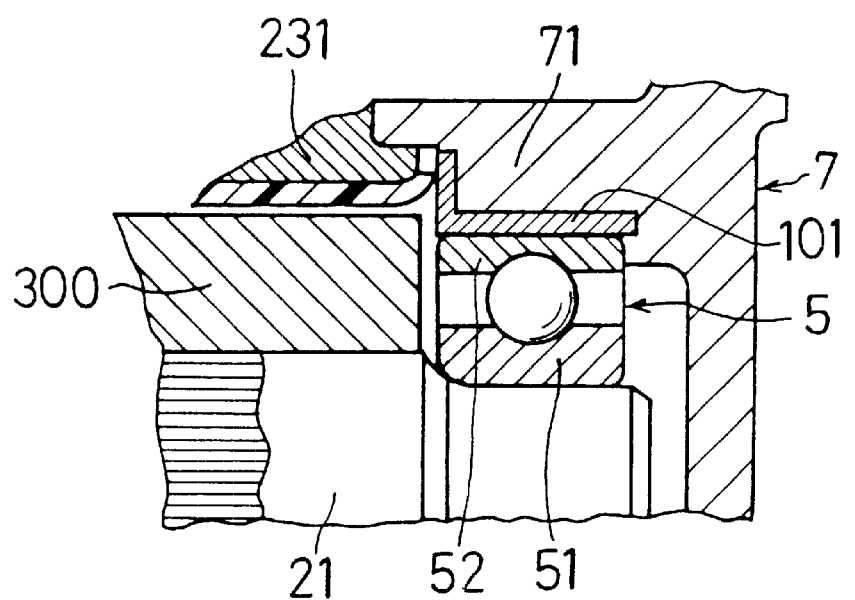
FIG. 6 is an axial cross-sectional view of a variation 4 of the generator shown in FIG. 1.

As shown in FIG. 6, a steel flange member 101 that includes 0.9–1 weight % silicon is inserted between the outer ring 52 of the bearing 5 and the bearing box 71 that is integrated with the rear frame 7 and protrudes from the rear frame 7 in the axial direction.

Since the thermal expansion of the flange member 101 decrease as the thermal expansion of the outer ring 52 decreases by increase in the silicon content, the undesired rotation of the outer ring 52 relative to the bearing box 71 can be prevented. The flange member 101 is made of material of a high magnetic permeability, in order to reduce the magnetic reluctance.

A second embodiment is described with reference to FIG. 3.

A brushless AC generator according to the second embodiment has modified members that are substituted for the pair of pole cores 221 and 222 and the ground plate 231 of the brushless AC generator having the above-described bearing according to the first embodiment shown in FIG. 1.

Figure 3:
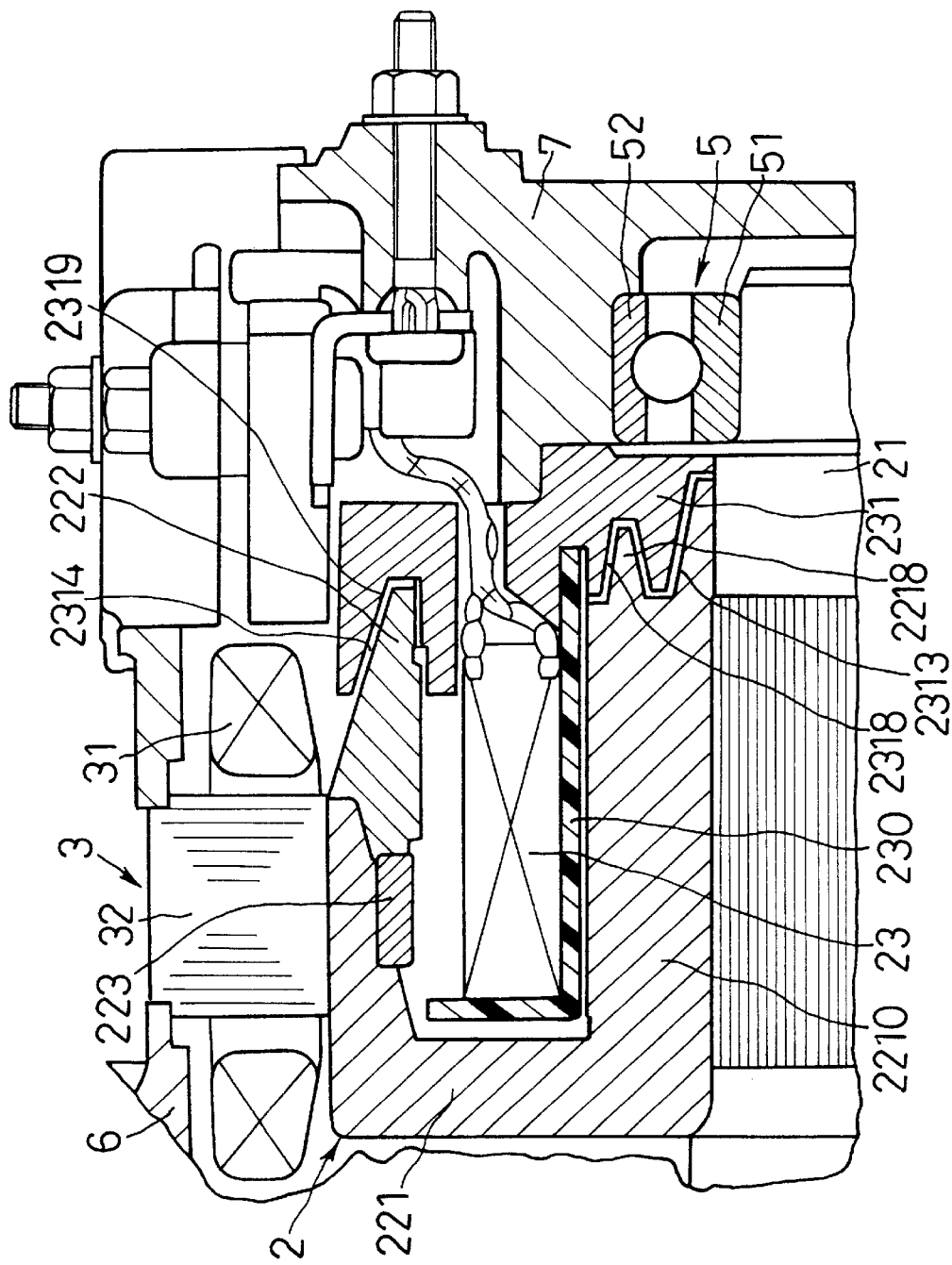
FIG. 3 is an enlarged fragmentary cross-sectional view of a vehicle brushless AC generator according to a second embodiment of the invention.

A zigzag gap 2313 is formed between the ground plate 231 and the pole core 221, as shown in FIG. 3, in order to increase the area of the small gaps 2311 and 2312 of the generator according to the first embodiment. Another zigzag gap 2314 is also formed between the ground plate 231 and the pole core 222.

In more detail, at radially inner side of the ground plate 231, an annular groove 2318 is formed at the surface of the ground plate 231 that faces the rotary yoke 2210 of the pole core 221 through the gap 2313. Correspondingly, an annular projection 2218 is formed at the rear side surface of the rotary yoke 2210 to be loosely fitted to the annular groove 2213 with the gap 2313 being interleaved.

In the same manner, at the radially outer side of the ground plate 231 of the stationary yoke, an annular groove 2319 is formed at the surface of the ground plate 231 that faces the claw-shaped pole pieces of the pole core 222 through the gap 2314. Correspondingly, claw-shaped pole pieces of the pole core 222 is loosely fitted to the groove 2318 with the gap 2314 being interleaved.

Consequently, the area of the gaps 2313 and 2314, which are formed on the opposite sides of the ground plate 231, can be increased so that the magnetic reluctance of the magnetic circuit can be reduced drastically, thereby increasing the output power.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A brushless AC generator including a stator having a stator core and an armature coil, a rotor having a shaft, a frame for supporting said stator and said rotor, a pulley fixed to an end of said shaft to be driven by a belt, a pulley-side bearing supported by said framed at a portion near said pulley and anti-pulley-side bearing supported by said frame at a portion remote from said pulley, wherein said rotor comprises a magnetic pole core having a plurality of circumferentially and equally disposed and alternately polarized magnetic pole pieces, a rotary yoke integrated with a group of said magnetic pole pieces that are polarized in one polarity and fixed to said rotary shaft;

a stationary yoke is interposed between the other group of said pole pieces that are polarized in the other polarity and said rotary yoke and a field coil fixedly surrounded by said magnetic pole core;

said anti-pulley-side bearing has a higher magnetic permeability than said pulley-side bearing.

2. The brushless AC generator according to claim 1, wherein said anti-pulley bearing includes higher silicon content than said pulley-side bearing.

3. The brushless AC generator according to claim 2, further comprises a resinous cylindrical member disposed between said outer ring of said anti-pulley-side bearing and said frame.

4. The brushless AC generator according to claim 2, further comprises a metal cylindrical member disposed between said outer ring of said anti-pulley-side bearing and said frame, wherein said metal cylindrical member includes 0.9–1 weight % silicon.

5. The brushless AC generator according to claim 1, wherein the end surface of said anti-pulley-side bearing faces an axial end surface of said rotary yoke.

6. The brushless AC generator according to claim 1, wherein said anti-pulley-side bearing comprises an outer ring that includes 0.9–1.1 weight % silicon.

7. The brushless AC generator according to claim 1, further comprising a cover fixed to said frame to face said frame supporting anti-pulley-side bearing at a certain gap and envelops to provide cooling medium.

* * * * *